(12) United States Patent
Templeman et al.

(10) Patent No.: US 10,862,088 B2
(45) Date of Patent: Dec. 8, 2020

(54) BATTERY CASE

(71) Applicant: Savior Products, Inc., Lenexa, KS (US)

(72) Inventors: Jon Clayton Templeman, Overland Park, KS (US); Brock Christian Templeman, Overland Park, KS (US)

(73) Assignee: Savior Products, Inc., Lenexa, KS (US)

( * ) Notice: Subject to any disclaimer, the term of this patent is extended or adjusted under 35 U.S.C. 154(b) by 27 days.

(21) Appl. No.: 16/050,200

(22) Filed: Jul. 31, 2018

(65) Prior Publication Data

US 2019/0044117 A1 Feb. 7, 2019

Related U.S. Application Data

(60) Provisional application No. 62/614,695, filed on Jan. 8, 2018, provisional application No. 62/541,216, filed on Aug. 4, 2017.

(51) Int. Cl.
*H01M 2/10* (2006.01)
*B60L 50/64* (2019.01)

(52) U.S. Cl.
CPC .......... *H01M 2/1094* (2013.01); *B60L 50/64* (2019.02); *H01M 2/1072* (2013.01); *H01M 2/1083* (2013.01); *H01M 2220/20* (2013.01)

(58) Field of Classification Search
CPC .................. H01M 2/1094; H01M 2/1083
See application file for complete search history.

(56) References Cited

U.S. PATENT DOCUMENTS

| 4,367,572 A * | 1/1983 | Zielenski | B60R 16/04 |
| | | | 180/68.5 |
| 2016/0164056 A1* | 6/2016 | Templeman | H01M 2/1083 |
| | | | 429/100 |

\* cited by examiner

*Primary Examiner* — Olatunji A Godo
(74) *Attorney, Agent, or Firm* — Hovey Williams LLP

(57) ABSTRACT

A battery case for securing and mechanically isolating a battery from a vehicle having an OEM battery holder. The battery case includes an adapter for securing the battery case to the vehicle. The adapter is configured for placement within a receiving cavity defined by the OEM battery holder. The adapter has a footprint that is substantially identical to the footprint of the battery. The adapter further has securement features that are substantially identical to the securement features on the battery. The battery case further includes a lower battery containment plate for supporting the battery thereon. The battery case still further includes at least one shock absorbing element positioned between the adapter and the lower battery containment plate for absorbing shocks and vibrations received from the vehicle so as to mechanically isolate the battery from the vehicle. The battery case still further includes an upper battery containment plate for placement over the battery for retaining the battery between the lower and upper battery containment plates.

24 Claims, 8 Drawing Sheets

BATTERY CASE

RELATED APPLICATIONS

The present application is a non-provisional patent application and claims priority benefit, with regard to all common subject matter, of earlier-filed U.S. Provisional Patent Application Ser. No. 62/541,216, filed on Aug. 4, 2017, and entitled "BATTERY CASE", and U.S. Provisional Patent Application Ser. No. 62/614,695, filed on Jan. 8, 2018, and entitled "BATTERY CASE", both of which are hereby incorporated by reference in their entireties into the present application.

BACKGROUND

Cars, boats, motorcycles, and other vehicles typically include one or more batteries for storing and providing electrical power. These batteries often fail or prematurely degrade in performance due to excessive vibrations and shocks generated or transmitted by the vehicles and/or the vehicles' operating environments. This is especially true for batteries used in boats, personal watercraft, all-terrain vehicles, and other vehicles that operate in rough water or uneven terrain. All types of batteries, and particularly absorbent glass mat (AGM) batteries, gel cell batteries, spiral cell batteries, and Lithium batteries, are expensive, difficult to replace, and difficult to safely dispose and recycle. Thus, avoiding premature battery failure and replacement is highly desired.

Most vehicles are equipped with battery boxes, trays, or other holders (OEM battery holders) to secure their batteries, but such OEM battery holders often don't absorb vibrations and shocks well and may actually transmit or amplify vibrations. Shock and/or vibration absorbing pads (pads) may be placed in these OEM battery holders and under their batteries, but such pads are ineffective and do not secure the batteries to their vehicles. The batteries therefore must be strapped onto or otherwise secured to the vehicles while they are on the pads, but doing so eliminates much of the benefits of the pads because the straps, brackets, clamps or other securement mechanisms compress the pads and thus limit their effectiveness. Moreover, the straps, brackets, clamps or other securement mechanisms necessary to hold the battery in place provide a direct mechanical pathway for vibrations and shocks to travel directly through to the battery, thus negating or at least minimizing the pads' effectiveness to absorb vibrations and shocks.

Supplemental battery cases and other aftermarket battery hold down and/or protection devices have also been developed to protect batteries as well as improve the battery's aesthetics, but they often don't fit properly in their intended vehicles. OEM battery holders are typically sized to fit particular batteries and have battery hold down structures designed to mate with or otherwise interact with corresponding securement features on these particular batteries. Aftermarket battery hold down and/or protection devices often don't fit within these OEM battery holders and don't interact with, and sometimes even cover-up or otherwise interfere with, the hold down structures. Thus, aftermarket battery hold down and/or protection devices often require vehicle modifications for installation to be possible, which consumers may not be capable of or comfortable with doing.

SUMMARY

The following brief description is provided to indicate the nature of the subject matter disclosed herein. While certain aspects of the present inventive concept are described below, the summary is not intended to limit the scope of the present inventive concept.

Embodiments of the present invention provide a battery case that improves on conventional approaches to aftermarket battery hold down and/or protection devices. Namely, rather than covering or replacing conventional hold down structures in OEM battery holders with aftermarket devices according to conventional techniques, embodiments of the present invention instead adopt a "supplementary" design approach. In this manner, any efforts of a manufacturer to contain the battery and possibly improve battery life through thoughtful design of an OEM battery holder and its battery hold down structure are no longer negated through circumvention by an aftermarket battery hold down and/or protection device. Rather, a battery case according to embodiments of the present invention is configured to combine at least some of the advantages provided by OEM battery holders together with those of added aftermarket holders.

More particularly, embodiments of the present invention provide a battery case for containing a battery or batteries in an OEM battery holder and additionally mechanically isolating the battery or batteries from shocks and vibrations. The battery case includes an adapter for securing the battery case to the vehicle. The adapter is configured for placement within a receiving cavity defined by an OEM battery holder. Importantly, the adapter has substantially the same footprint as the bottom of the battery or batteries that are specified for the vehicle such that the adapter, and hence the entire battery case, fits within the OEM battery holder provided with the vehicle without modifications to the OEM battery holder or vehicle. Moreover, the adapter has substantially the same securement features as the securement features on the batteries specified for the vehicle such that the securement features on the adapter mate with or otherwise interact with the battery hold down structures provided with the OEM battery holder.

The battery case further includes a lower battery containment plate for supporting the battery thereon. The battery case still further includes at least one shock absorbing element positioned between the adapter and the lower battery containment plate for absorbing shocks and vibrations received from or transmitted through the vehicle so as to mechanically isolate the battery from the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

Embodiments of the present invention provide a battery case that does not cover or entirely replace conventional hold down structures in OEM battery holders. Instead, the battery case adopts a "supplementary" design approach so as not to negate any efforts of a manufacturer to contain the battery or improve battery life through thoughtful design of an OEM battery holder and corresponding battery hold down structure. The battery case, according to embodiments of the present invention, is configured to combine at least some of the advantages provided by OEM battery holders together with those of added aftermarket battery hold down and/or protection devices.

More particularly, embodiments of the present invention provide a battery case that fits within an OEM battery holder for mechanically isolating a battery from the vehicle in which the OEM battery holder is installed. The battery case includes an adapter for securing the battery case to the vehicle. The adapter is configured for placement within a receiving cavity defined by an OEM battery holder and has substantially the same footprint as the bottom of the battery or batteries that are specified for the vehicle such that the adapter, and hence the entire battery case, will fit within the OEM battery holder without the need for modification to the battery case or the OEM battery holder. Moreover, the adapter has substantially the same securement features as the batteries specified for the vehicle such that the securement features on the adapter mate with or otherwise interact with the battery hold down structures provided with the OEM battery holder.

Figure 9:
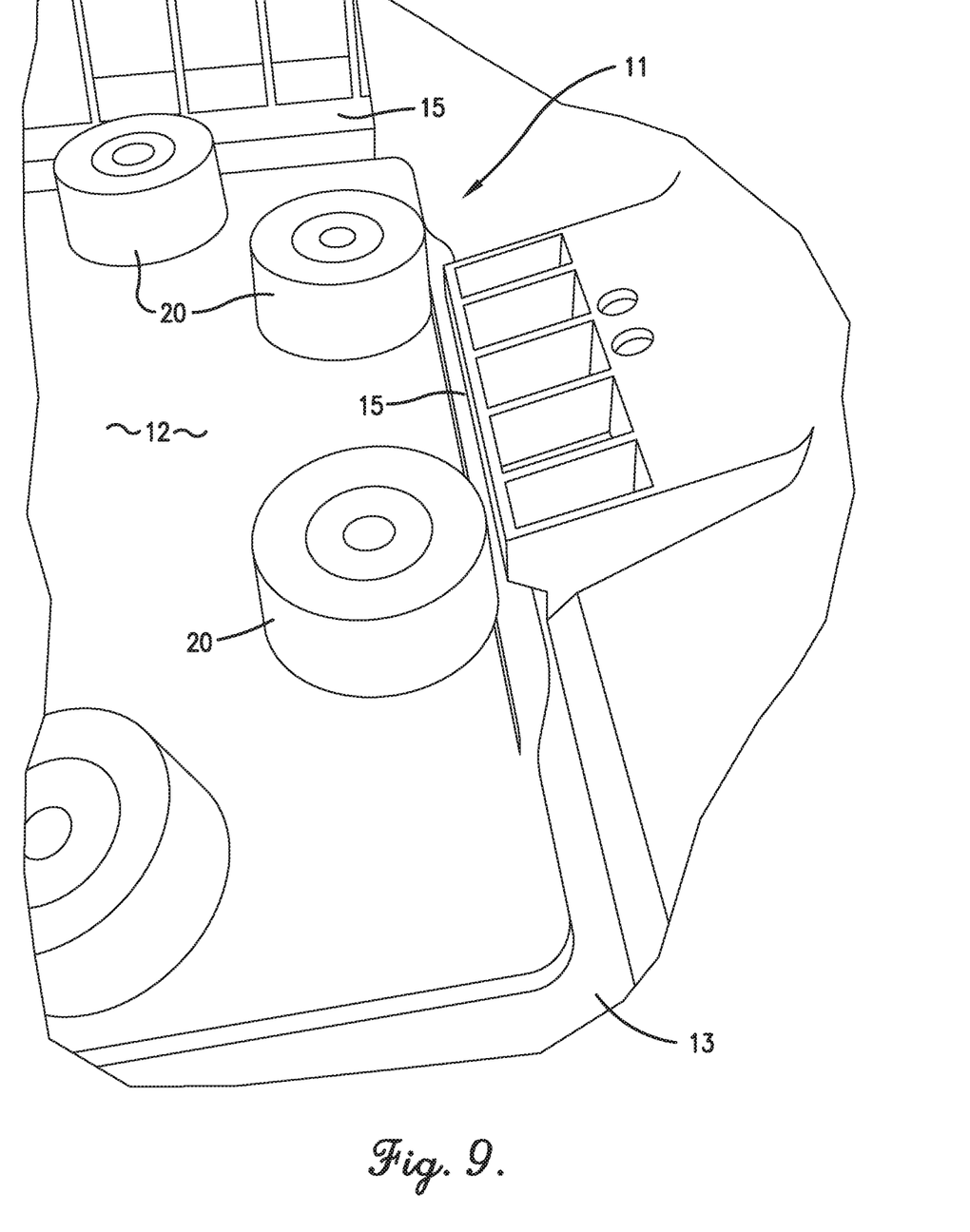
FIG. 9 is a top view of the adapter and shock absorbing elements removed from the remainder of the battery case and shown coupled with an OEM battery holder.

Specific embodiments of the invention will now be described in more detail with reference to the attached drawing figures. A battery case 10 constructed in accordance with an embodiment of the present invention broadly comprises an adapter 12, a lower battery containment plate 14, an upper battery containment plate 16 or other securement component, a number of spacer rods 18, and a number of shock absorbing elements 20. The battery case 10 is configured to mount on or within an OEM battery holder of a vehicle. The OEM battery holder may be any tray, platform, support, etc. that is originally equipped in a vehicle to hold one or more vehicle batteries. A portion of an exemplary OEM battery holder 11 is shown in FIG. 9 and includes a floor 13 and a number of hold-down features 15 adjacent the floor. The hold-down features 15 may include one or more horizontally-extending hold-down flanges or bolts, brackets, clamps, clips, retainers, screws, or other hold-down devices designed to mate with corresponding structure on a battery or batteries intended for installation in the vehicle in which the battery tray is mounted. The battery case 10 may be sized and configured for holding any number of batteries, but for simplicity, is shown and described herein as holding one battery 22.

The adapter 12 supports the weight of the battery 22 and the other components of the battery case 10 on or in the OEM battery holder 11 or another surface or mounting component of the vehicle and may be formed of corrosion resistant billet aluminum, die-cast aluminum, molded plastic, or any other suitable material. Importantly, the adapter 12 has substantially the same footprint as the battery 22 that is specified for the vehicle such that the adapter 12, and hence the entire battery case 10, will fit within the OEM battery holder 11 provided with the vehicle. Moreover, the adapter 12 has substantially the same securement features as the standardized securement features on the battery 22 such that the securement features on the adapter mate with or otherwise interact with the battery hold down structures 15 on the OEM battery holder 11.

Figure 1:
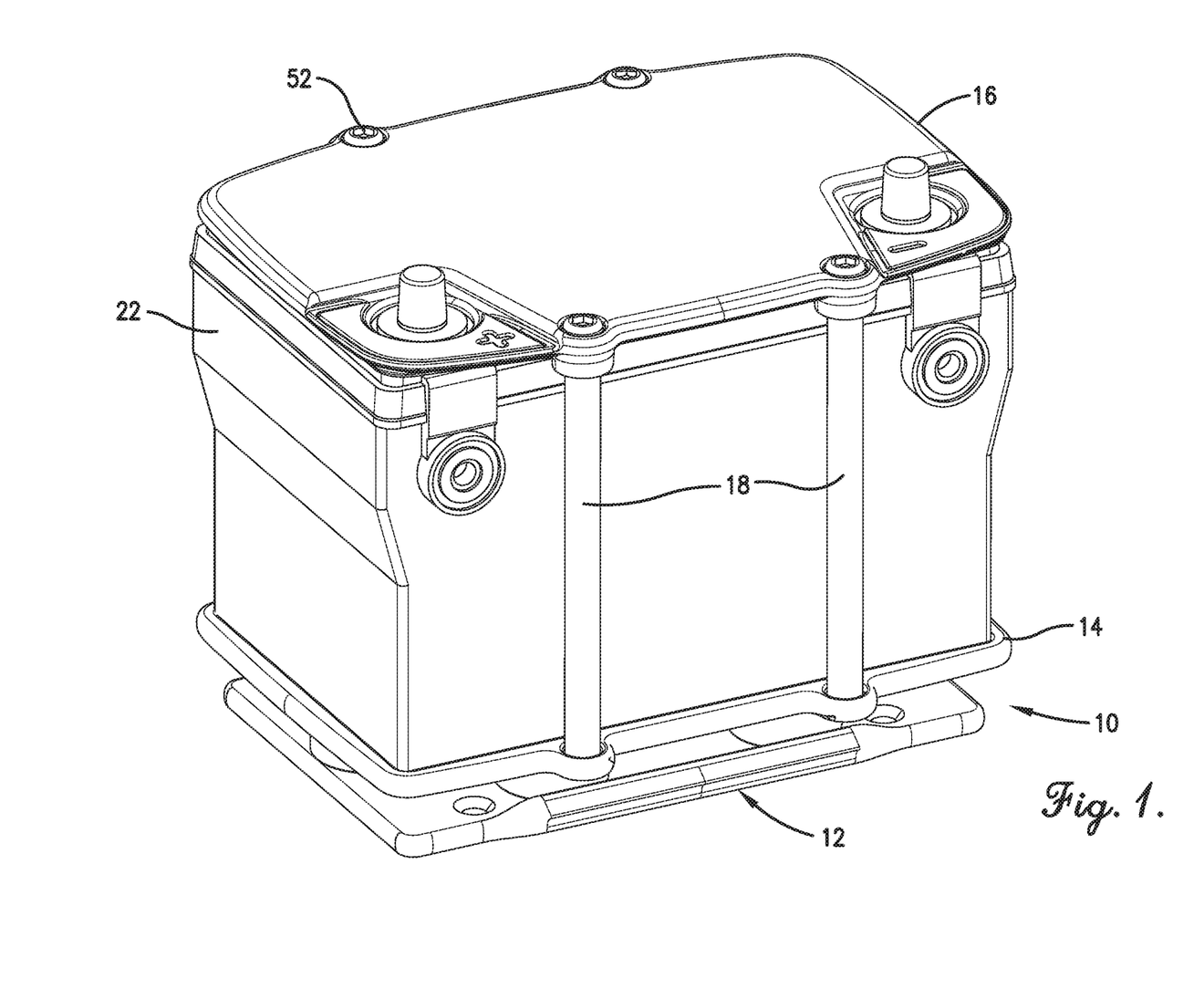
FIG. 1 is a perspective view of a battery case constructed in accordance with an embodiment of the present invention and shown holding a battery.
Figure 2:
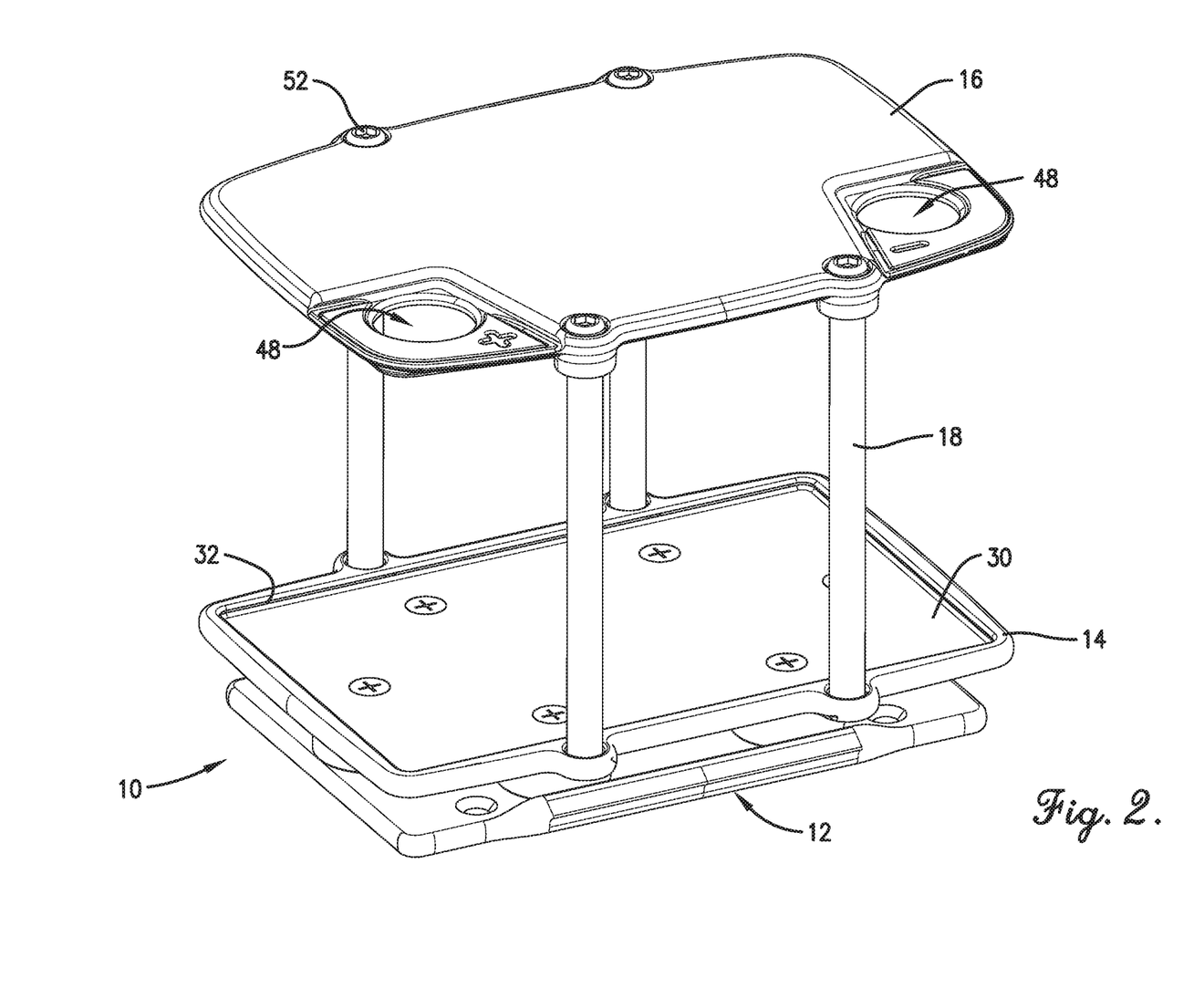
FIG. 2 is another perspective view of the battery case of FIG. 1 without the battery.
Figure 3:
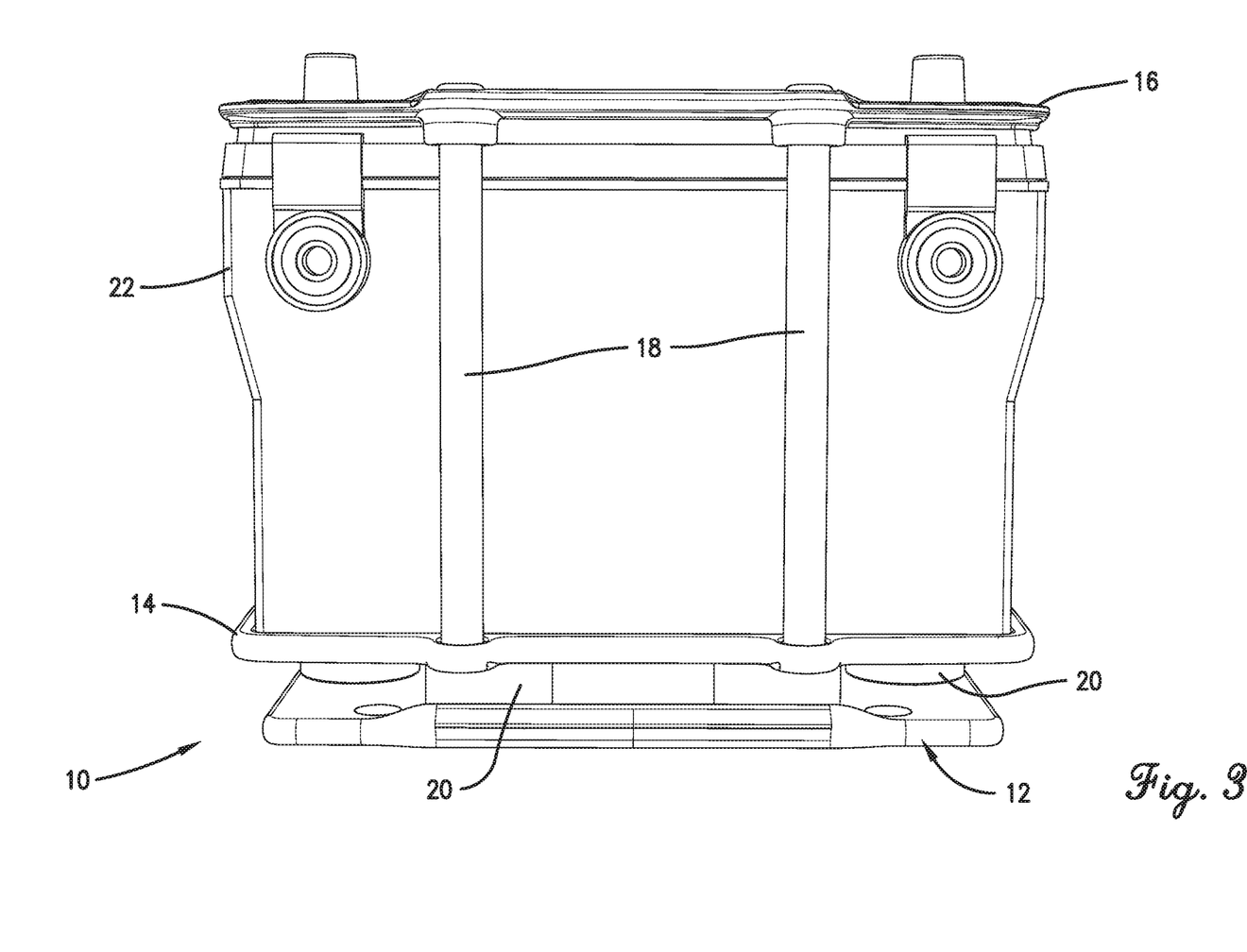
FIG. 3 is a front view of the battery case of FIG. 1 shown holding a battery.
Figure 4:
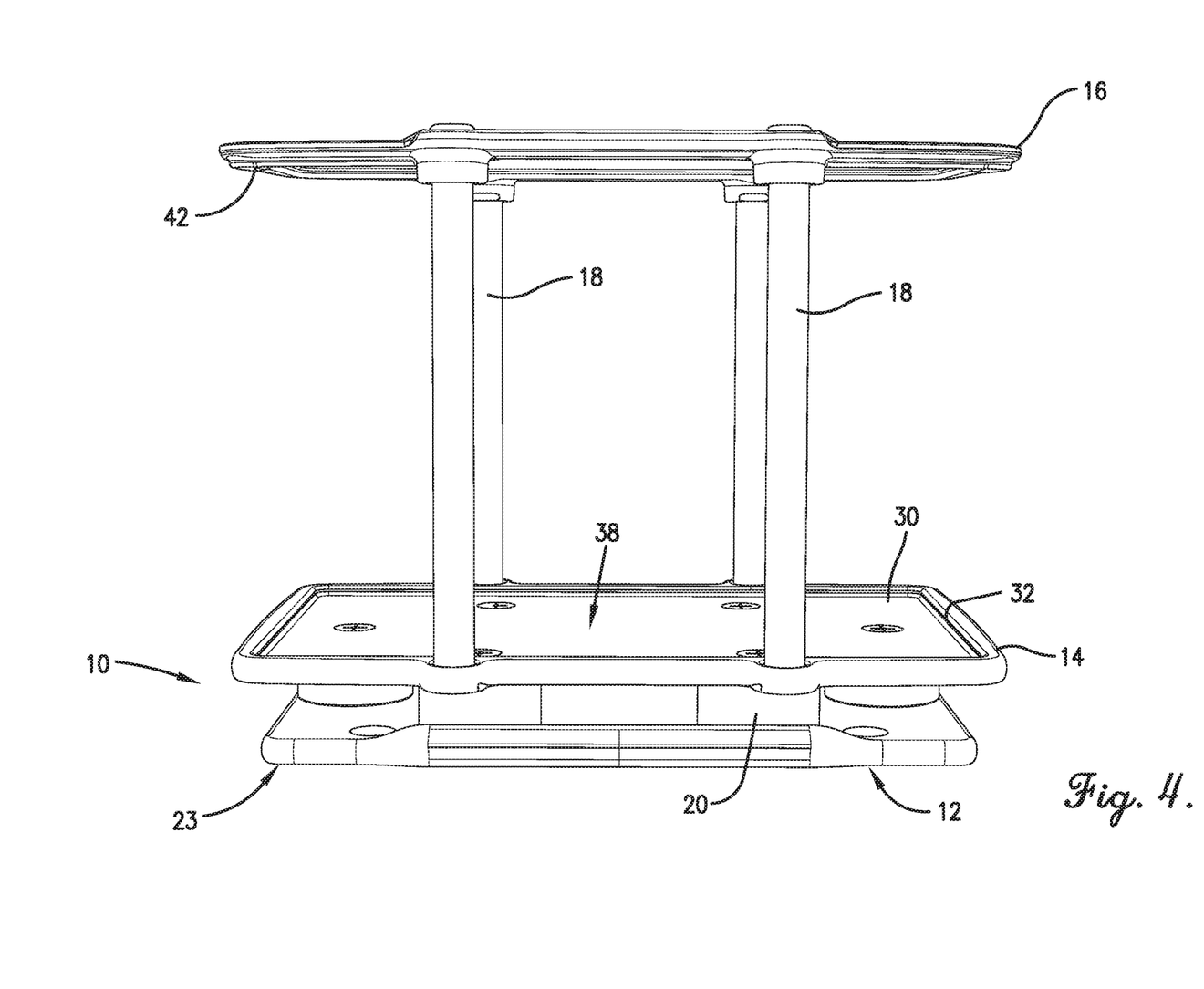
FIG. 4 is another front view of the battery case of FIG. 1 without the battery.
Figure 5:
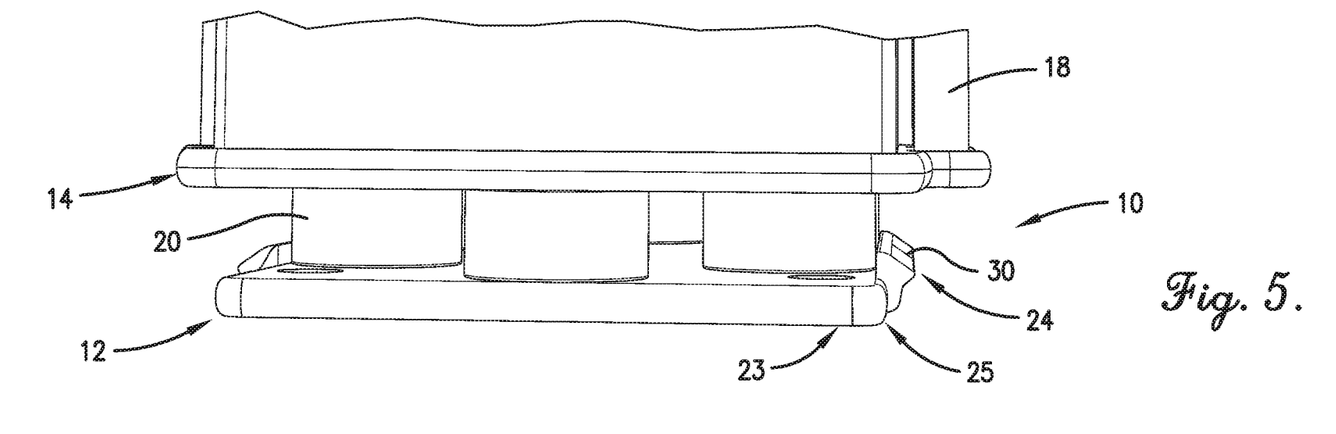
FIG. 5 is a partial side perspective view of the battery case of FIG. 1.
Figure 6:
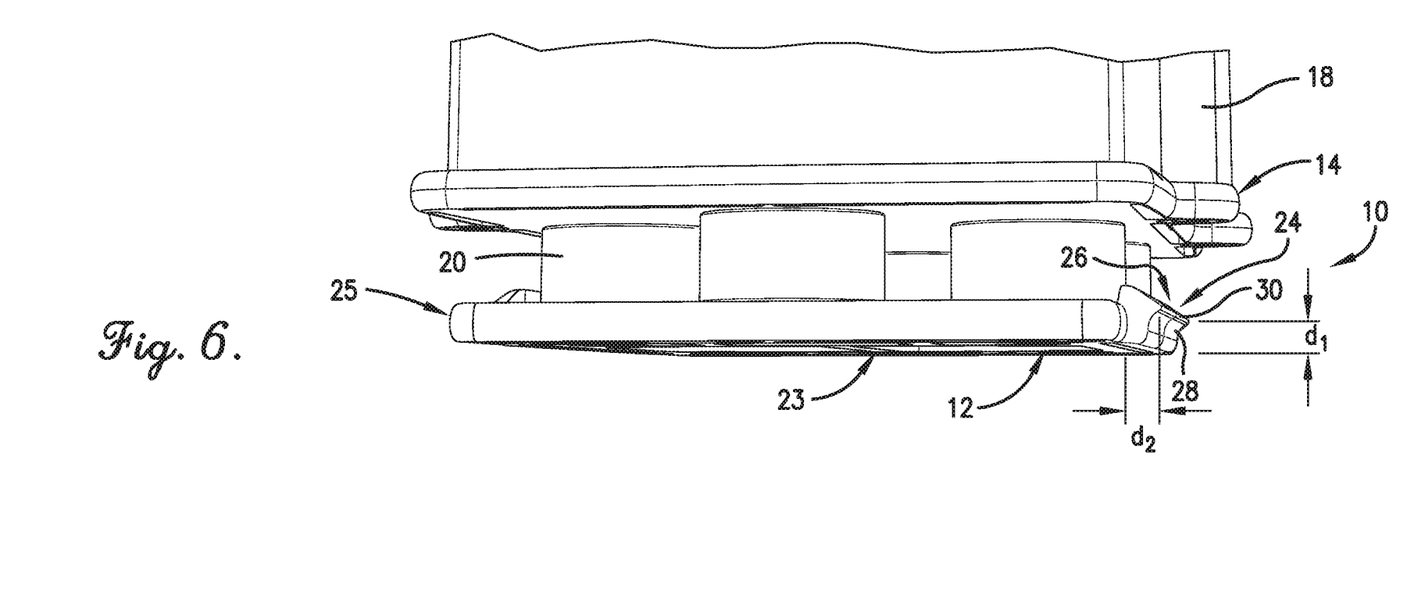
FIG. 6 is another partial side perspective view of the battery case of FIG. 1.
Figure 7:
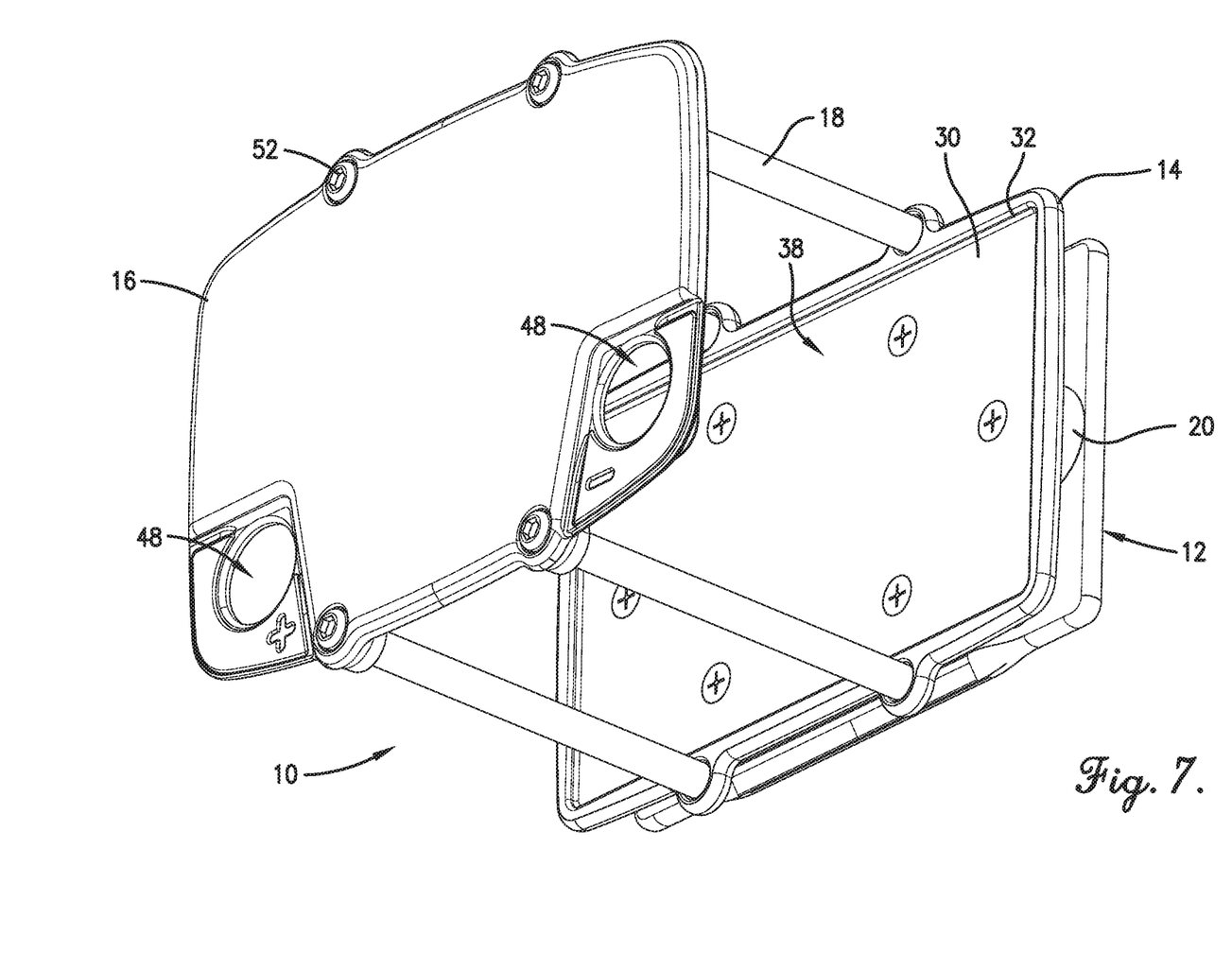
FIG. 7 is a top perspective view of the battery case.
Figure 8:
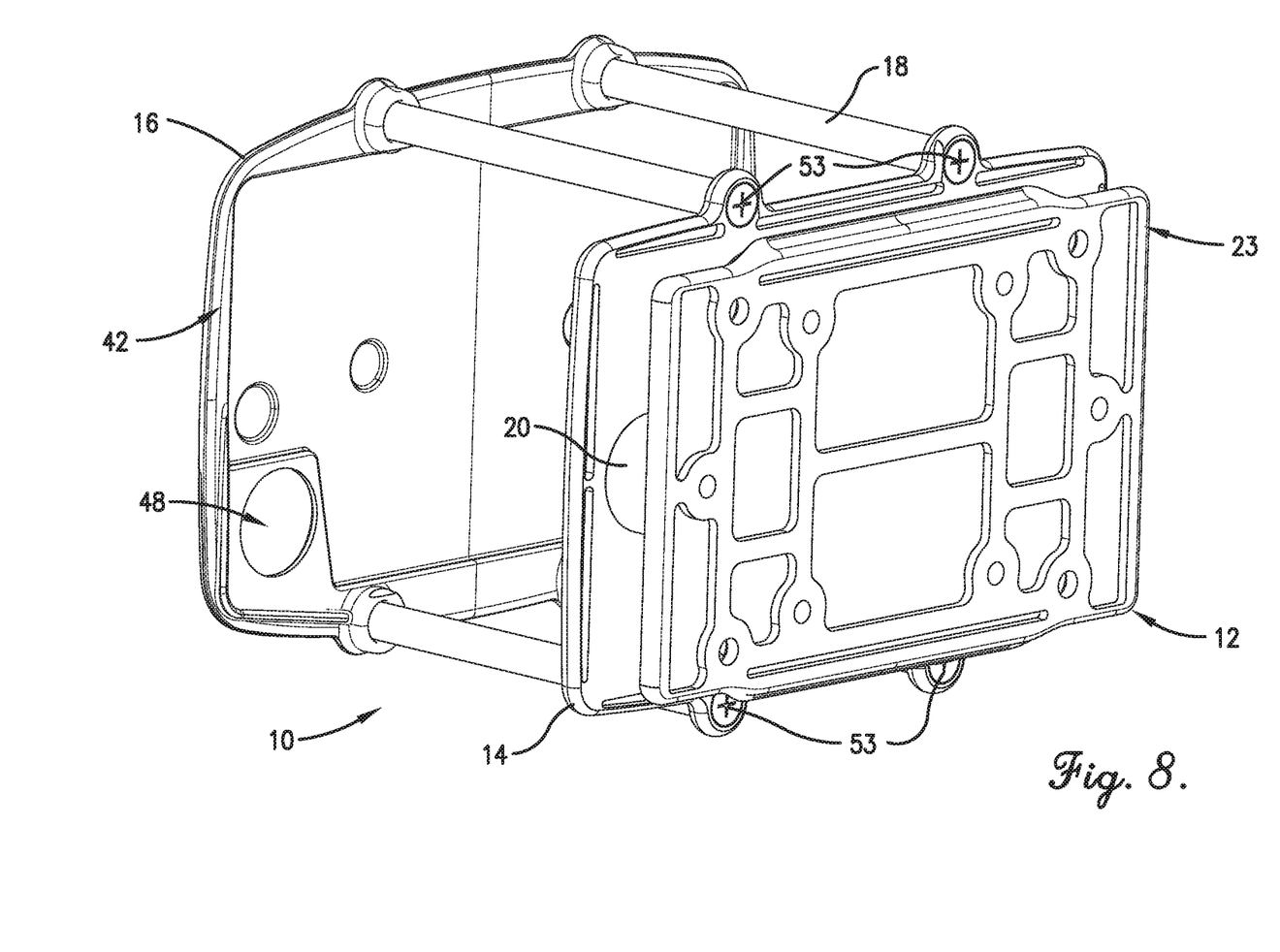
FIG. 8 is a bottom perspective view of the battery case.

An embodiment of the adapter 12 includes a substantially planar bottom surface 23 and a protruding foot 24, as shown in detail in FIGS. 5 and 6. The adapter 12 also includes a perimeter sidewall 25 presenting a substantially rectangular margin. The adapter 12 also includes fastener holes for receiving shock absorber fasteners therethrough. The adapter 12 may also include through-holes for attaching the adapter 12 to a surface or area of the vehicle that does not include battery hold down structures. It is foreseen that the adapter 12 may take many different shapes without departing from the spirit of the present invention. For example, the adapter 12 may include a discontinuous, perforated and/or substantially non-planar bottom surface, though preferably a plurality of portions of such a bottom surface and/or a perimeter sidewall would nonetheless present bottom surfaces in a single plane on which a battery case may be supported. For another example, a perimeter sidewall of the adapter 12 may not be substantially continuous and/or may present a margin having other than a rectangular profile. For another example, the fastener holes and shock absorbing fasteners may not be needed if the shock absorbing elements are co-molded to the adapter 12.

The protruding foot 24 includes top and bottom incline surfaces 26, 28 and extends along a portion of a side of the adapter 12. In the illustrated embodiment, the protruding foot 24 includes a lateral apex 30 a distance d1 above the bottom surface 23 and a distance d2 from the perimeter sidewall 25. The protruding foot 24 is configured to be substantially the same as the standardized securement feature found on the battery and to be placed and to nest within a receiving structure of an OEM battery holder as shown in FIG. 9 to aid in securing the battery case 10 to the OEM battery holder 11.

Preferably, an OEM battery holder for use in connection with embodiments of the present invention is constructed according to one or more industry standards that define the placement and dimensions of coupling structures typically found on primary casing of the battery to be used with the equipment in question. In view of the standardized position and dimensions of the battery's coupling structure, the manufacturer preferably designs the OEM battery holder to include receiving structure for securely receiving the coupling structure thereon. For instance, an industry standard battery may include a flange extending along a long side of the battery and having a top surface extending 10.5 mm above a bottom surface of the battery. The manufacturer may design an OEM battery holder to receive the battery's flange securely within a receiving portion of the tray such as illustrated in FIG. 9. The receiving structure may, for example, be a lip constructed of corrosion resistant billet aluminum, molded plastic, or any other suitable material and configured to extend over at least a portion of the top surface of the battery flange for coupling therebetween.

It is foreseen that the OEM battery holder may include receiving structure constructed according to various industry standards without departing from the spirit of the present invention. One of ordinary skill will also appreciate that the configuration of a complementary coupling structure of the adapter 12—such as the protruding foot 24—may be altered to match such receiving structure in various ways, for example by extending and/or reducing one or both of distances d1, d2, varying the shape and angle of inclination of one or both of the top and bottom surfaces of a protruding foot, or otherwise altering the dimensionalities of the protruding foot to complement the manufacturer tray in question. Preferably one, and more preferably both, of a top surface and lateral apex of the protruding foot 24 extend at least partly beneath and maintain contact with a portion of the receiving structure (e.g., a lip or hold-down features 15 of the OEM battery holder), thereby securing the battery case 10 firmly to the OEM battery holder and reducing rattling or shifting of the battery case 10 that might damage the battery 22. It is also foreseen that the protruding foot 24 may not extend along a substantial portion of one or more sides of the adapter 12, and may instead comprise a short nub, protrusion or hook for placement within a receiving structure of an OEM battery holder without departing from the spirit of the present invention. Moreover, one of ordinary skill will appreciate that a protruding foot integrated into a perimeter sidewall of the adapter 12 is within the ambit of the present invention.

The lower battery containment plate 14 supports the battery 22 on the shock absorbing elements 20 and may be formed of corrosion resistant billet aluminum, die-cast aluminum, molded plastic, or any other suitable material. The lower battery containment plate 14 includes an upper surface 30, a vertical lip 32, at least one shock absorber fastener hole, and at least one spacer rod hole. The upper surface 30 includes a recessed area 38. The lip 32 retains any leaking battery liquid in the recessed area 38. The lip 32 extends around the recessed area 38. The shock absorber fastener holes receive shock absorber fasteners therethrough and are spaced from each other in line with the shock absorbing elements 20. The shock absorber fastener holes may be countersunk or counterbore for preventing battery liquid from leaking therethrough when shock absorber fasteners are secured therein. The spacer rod holes are counterbore through-holes for receiving lower ends of the spacer rods 18 in the wider counterbore portion and for receiving lower spacer rod fasteners through the narrow through-hole portion. Lower spacer rod fasteners may be helical-threaded bolts having a male or female hex head, square head, or any other suitable head.

The combination adapter 12, battery containment plate 14, and shock absorbing elements 20 extending therebetween preferably combine the battery protection measures provided by the battery case 10 with those provided by an OEM battery holder, at least in part because the battery case 10 is secured to the OEM battery holder by nestling and/or coupling the adapter 12 with the receiving structure of the OEM battery holder in a manner analogous to the coupling originally intended by the manufacturer.

The upper battery containment plate 16 covers the top of the battery 22 and may be formed of corrosion resistant billet aluminum, die-cast aluminum, molded plastic, or any other suitable material. The upper battery containment plate 16 includes a lower surface 42, a vertically extending lip, at least one spacer rod hole, and may or may not include one or more terminal openings 48. The lower surface 42 includes a recessed area for receiving a top portion of the battery 22. The lip retains the battery 22 in the recessed area under the upper battery containment plate 16. The lip extends around the recessed area and extends downward from the recessed area. The spacer rod holes receive upper spacer rod fasteners 52 therethrough and are aligned with the spacer rod holes of the lower battery containment plate 14. The spacer rod holes may each be positioned in a recessed area of the upper battery containment plate so that the upper spacer rod fasteners 52 do not extend above an upper surface of the upper battery containment plate 16. The upper spacer rod fasteners 52 are helical-threaded bolts having a male or female hex head, square head, or any other suitable head. The head may also be a round head, flat head, button head, or other smooth head for providing an attractive look to the battery case 10 and for minimizing the chance of the upper spacer rod fasteners 52 inadvertently becoming loose. The terminal openings 48 provide access to the battery terminals and/or the filler caps of the battery 22. The terminal openings 48 may be a regular shape such as a slot or may be an irregular shape for providing access to terminals and/or filler caps of different sized batteries. The upper battery containment plate 16 may also be a covering without the terminal openings 48, so as to cover and conceal the battery terminals and battery connections. As an alternative to the upper battery containment plate 16, a securement component such as a covering, a lid, a case, or one or more straps, cords, ropes, chains, clamps, brackets, U-shaped bolts, side plates, or other elements may be used for securing the battery 22 to the lower battery containment plate 14.

The spacer rods 18 retain the upper battery containment plate 16 over the battery 22 and are elongated metal rods, bolts, connectors, or other fasteners. The spacer rods 18 extend from the spacer rod holes of the lower containment plate 14 to the spacer rod holes of the upper containment plate 16. In one embodiment, the battery case 10 include two spacer rods 18 with one rod extending near each end of the battery case 10. In another embodiment, the battery case 10 includes four spacer rods 18 with one rod extending in the proximity of each corner of the battery case 10.

The shock absorbing elements 20 isolate the battery 22 from vibrations and shocks generated or transmitted by the vehicle and may be disc-shaped or any other suitable shape. The shock absorbing elements 20 may be rubber, thermoplastic rubber, thermoplastic elastomer (TPE), thermoplastic polyurethane (TPU), or any other suitable material or component. The shock absorbing elements 20 are positioned between the adapter 12 and the lower containment plate 14 in line with the fastener holes of the adapter 12 and the fastener holes of the lower battery containment plate 14. In one embodiment, the battery case 10 includes six shock absorbing elements 20 with four elements positioned in a rectangular array and two elements spaced on opposite sides of the rectangular array.

The above-described battery case 10 may be assembled, for example onto a vehicle, as follows: first, the adapter 12—optionally with shock absorbing elements 20 already fixed thereto—is positioned along a battery tray or other OEM battery holder mounted on the vehicle with the protruding foot 24 within a receiving structure of the battery tray. Preferably, the protruding foot 24 is at least partly covered by the receiving structure, which may comprise a lip extending over and sitting flush against the top surface 26 of the protruding foot 24. The adapter 12 may optionally be further secured to the battery tray or other OEM battery holder using additional snap fittings and/or fasteners. Where the shock absorbing elements 20 are not already fixed to the adapter 12, they may be fastened to the adapter 12 via lower shock absorber fasteners.

The spacer rods 18 are then fastened to the lower battery containment plate 14 via the lower spacer rod fasteners 53 by inserting the lower ends of the spacer rods 18 into the counterbore portion of the spacer rod holes with the ends of the spacer rods 18 fitting over the ends of the lower spacer rod fasteners that are extending upward through the spacer rod holes. The lower spacer rod fasteners are then turned using a conventional wrench, hex key, or other tool so that the helical threads of the lower spacer rod fasteners draw the lower ends of the spacer rods 18 further into the counterbore portion of the spacer rod holes. The lower spacer rod fasteners are tightened until the connector rods 18 are snug against the top surface of the counterbore portion of the rod spacer holes in the battery containment plate 14. The lower battery containment plate 14 with the connector rods attached and extending upward is then fastened to the shock absorbing elements 20 via upper shock absorber fasteners with the recessed area 38 facing upward. The battery 22 is then placed on the recessed area 38 of the lower battery containment plate 14. The upper battery containment plate 16 is then placed over the top of the battery 22 with the recessed area of the lower surface 42 of the upper battery containment plate 16 facing downward so that the upper portion of the battery 22 is received in the recessed area of the lower surface 42 and the spacer rod holes are aligned over the upper ends of the connector rods. The spacer rods 18 are then fastened to the upper battery containment plate 16 via the upper spacer rod fasteners 52. The upper spacer rod fasteners are tightened until the upper battery containment plate 16 is snug against the top of the battery 22. Depending on the height of the battery 22, the upper ends of the spacer rods 18 may extend only partially into the counterbore portion of the spacer rod holes when the upper spacer rod fasteners are fully tightened. In one embodiment, the terminals of the battery will extend upward through the terminal openings 48. In another embodiment, the upper battery containment plate 16 has no terminal openings 48 and is a solid cover mounted to longer spacer rods extending above the terminals of the battery 22.

In one embodiment of the invention, the adapter 12, the lower battery containment plate 14, and the shock absorbing elements 20 are pre-assembled into a shock base. The shock base is mounted to the OEM battery holder or other vehicle surface. The battery 22 is then placed on the lower battery containment plate 14 and the upper battery containment plate 16 is attached over the battery 22 via the spacer rods 18 as described above.

In another embodiment of the invention, a securement component is used instead of the upper battery containment plate 16 to secure the battery 22 to the lower battery containment plate 14. For example, a strap could be woven through two slots in the lower battery containment plate 14 and cinched down over the battery 22. As another example, a case lid could be placed over the battery and screwed or snapped onto the lower battery containment plate 14.

When the battery case 10 is assembled, the lower battery containment plate 14 and the upper battery containment plate 16 (or securement component) secure the battery 22 between them, and the shock absorbing elements 20 mechanically isolate the battery 22 from the vehicle. Because the lower and upper shock absorber fasteners are not connected to each other, the only physical connection between the battery containment plates 14, 16 and the adapter 12 is a shock absorption portion of each shock absorbing element 20. This prevents vibrations and shocks from passing to the battery 22. Specifically, when the shock absorbing elements 20 are subjected to a compressive force, they compress inwardly from the top to bottom and bulge outwardly along their radial sidewalls to absorb and dampen the force. Similarly, when the shock absorbing elements 20 are subjected to a tensional force, they stretch outwardly from top to bottom and compress inwardly along their radial sidewalls to absorb or dampen the force.

The above-described battery case 10 provides several advantages over conventional battery cases. For example, the battery case 10 both secures the battery 22 to the vehicle and protects the battery 22 from vibrations and shocks. Moreover, the adapter 12 is secured along the OEM battery holder using receiving structure originally intended to receive the battery 22, which means the battery case 10 also takes advantage of at least some of the battery protection and containment features incorporated into the manufacturer tray.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A battery case for mechanically isolating a battery from a vehicle having an OEM battery holder, the battery having a footprint and securement features, the OEM battery holder having a receiving portion and hold down structure that interacts with the securement features on the battery, the battery case comprising:
   an adapter for securing the battery case to the vehicle, the adapter being configured for placement within the receiving portion of the OEM battery holder such that the adapter sits within and directly contacts the receiving portion of the OEM battery holder, the adapter having an outer periphery that does not extend beyond the footprint of the battery, the adapter further having securement features that are substantially operationally identical to the securement features on the battery;
   a lower battery containment plate for supporting the battery thereon such that the battery sits on and directly contacts the lower battery containment plate; and
   at least one shock absorbing element positioned between the adapter and the lower battery containment plate for absorbing shocks and vibrations so as to partially mechanically isolate the battery from the vehicle.

2. The battery case as set forth in claim 1, wherein the securement features on the adapter comprise an inclined surface extending from a side of the adapter that is configured to be placed beneath the hold down structure of the OEM battery holder.

3. The battery case of claim 1, further comprising an upper battery containment plate for placement over the battery for retaining the battery between the lower and upper battery containment plates.

4. The battery case of claim 1, wherein the at least one shock absorbing element forms the only physical connection between the battery and the adapter such that no unmitigated pathways exist for shocks and vibrations to reach the battery from the vehicle to mechanically isolate the battery from the vehicle.

5. The battery case of claim 3, wherein the upper battery containment plate contains at least one opening for accessing terminals and filler caps of the battery.

6. The battery case of claim 3, wherein the lower battery containment plate comprises an upper surface having a recessed region for supporting a bottom portion of the battery and for capturing any battery liquid leaking from the battery, a lip extending around the recessed region of the upper surface for retaining the bottom portion of the battery and any leaking battery liquid in the recessed region, and a lower surface.

7. The battery case of claim 6, wherein the upper and lower surface contain at least one fastener hole for receiving fasteners.

8. The battery case of claim 5, wherein the at least one opening in the upper battery containment plate provides access to terminals of different sized batteries.

9. The battery case of claim 1, wherein the adapter, the lower battery containment plate, and the at least one shock absorbing element are pre-assembled into a shock base.

10. The battery case of claim 3, further comprising at least one spacer rod for fastening the upper battery containment plate to the lower battery containment plate.

11. The battery case of claim 10, wherein the lower battery containment plate includes at least one counterbore through-hole for receiving a helical-threaded end of at least one spacer rod in the counterbore portion of the through-hole and for receiving a helical-threaded spacer rod fastener upward through the through-hole, the spacer rod fastener being configured to engage the helical-threaded end of the spacer rod and to draw the spacer rod downward into the counterbore portion of the through-hole so as to tighten the upper battery containment plate against the top of the battery.

12. The battery case of claim 11, wherein the helical-threaded ends of the spacer rods are female-type receivers and the spacer rod fasteners are male-type fasteners.

13. The battery case of claim 1, wherein the at least one shock absorber includes a shock absorption portion for absorbing vibrations and shocks received from the vehicle, a lower fastener for connecting the shock absorber to the adapter, and an upper fastener for connecting the shock absorber to the lower battery containment plate, the shock absorption portion extending between the lower fastener and the upper fastener.

14. The battery case of claim 13, wherein the lower fastener is a male-type fastener embedded in the bottom of the shock absorber and extending from the bottom of the shock absorber and the upper fastener is a female-type fastener embedded in the top of the shock absorber.

15. The battery case of claim 1, wherein the at least one shock absorber comprises six shock absorbers.

16. The battery case of claim 3, wherein the lower battery containment plate and the upper battery containment plate are formed of molded plastic or die-cast aluminum.

17. The battery case of claim 3, wherein the lower battery containment plate and the upper battery containment plate are machined from corrosion-resistant billet aluminum.

18. The battery case of claim 1, wherein the adapter is formed of molded plastic or die-cast aluminum.

19. The battery case of claim 1, wherein the adapter is machined from corrosion-resistant billet aluminum.

20. A battery assembly for a vehicle having an OEM battery holder, the battery assembly comprising:
   a battery having a footprint and securement features;
   a battery case for mechanically isolating the battery from the vehicle, the battery case comprising:
      an adapter for securing the battery case to the vehicle, the adapter being configured for placement within a receiving portion of the OEM battery holder such that the adapter sits within and directly contacts the receiving portion of the OEM battery holder, the adapter having an outer periphery that does not extend beyond the footprint of the battery, the adapter further having securement features that are substantially operationally identical to securement features on the battery;

a lower battery containment plate for supporting the battery thereon such that the battery sits on and directly contacts the lower battery containment plate;

an upper battery containment plate for retaining the battery on the lower battery containment plate;

at least one spacer rod for fastening the upper battery containment plate to the lower battery containment plate; and at least one shock absorbing element positioned between the adapter and the lower battery containment plate for absorbing vibrations and shocks so as to mechanically isolate the battery from the vehicle.

21. The battery case as set forth in claim 20, wherein the securement features on the adapter comprise an inclined surface extending from a side of the adapter that is configured to be placed beneath the hold down structure of the OEM battery holder.

22. The battery case of claim 20, wherein the at least one shock absorbing element forms the only physical connection between the battery and the adapter such that no unmitigated pathways exist for shocks and vibrations to reach the battery from the vehicle to mechanically isolate the battery from the vehicle.

23. The battery case of claim 20, wherein the at least one shock absorber includes a shock absorption portion for absorbing vibrations and shocks received from the vehicle, a lower fastener for connecting the shock absorber to the adapter, and an upper fastener for connecting the shock absorber to the lower battery containment plate, the shock absorption portion extending between the lower fastener and the upper fastener.

24. The battery case of claim 23, wherein the lower fastener is a male-type fastener embedded in the bottom of the shock absorber and extending from the bottom of the shock absorber and the upper fastener is a female-type fastener embedded in the top of the shock absorber.

* * * * *